United States Patent [19]
Kostizak

[11] Patent Number: 5,814,804
[45] Date of Patent: *Sep. 29, 1998

[54] OPTICAL SCANNER ACTIVATED WITH POSITION LOCATOR

[75] Inventor: David Kostizak, Rochester, N.Y.

[73] Assignee: PSC Inc., Webster, N.Y.

[ * ] Notice: The term of this patent shall not extend beyond the expiration date of Pat. No. 5,448,050.

[21] Appl. No.: 714,499

[22] Filed: Sep. 16, 1996

Related U.S. Application Data

[63] Continuation of Ser. No. 522,054, Aug. 31, 1995, abandoned, which is a continuation of Ser. No. 975,760, Nov. 13, 1992, Pat. No. 5,448,050.

[51] Int. Cl.⁶ ........................................................ G06R 7/10
[52] U.S. Cl. ............................................. 235/472; 235/455
[58] Field of Search ..................................... 235/455, 472

[56] References Cited

U.S. PATENT DOCUMENTS

| | | |
|---|---|---|
| 4,488,679 | 12/1984 | Bockhoit . |
| 4,521,773 | 6/1985 | Lyon . |
| 4,703,186 | 10/1987 | Nakayama . |
| 4,780,707 | 10/1988 | Selker . |
| 4,782,221 | 11/1988 | Brass . |
| 4,793,812 | 12/1988 | Sussman . |
| 4,804,949 | 2/1989 | Faulkerjon . |
| 4,860,377 | 8/1989 | Ishigaki . |
| 4,906,843 | 3/1990 | Jones . |
| 4,959,871 | 9/1990 | Mori . |
| 5,023,922 | 6/1991 | Abramovitz . |
| 5,142,131 | 8/1992 | Collins . |
| 5,151,581 | 9/1992 | Krichever . |
| 5,200,597 | 4/1993 | Eastman ................................. 235/455 |
| 5,206,491 | 4/1993 | Katoh . |
| 5,227,909 | 7/1993 | Watson . |
| 5,229,588 | 7/1993 | Detwiller . |
| 5,301,243 | 4/1994 | Olschafskie . |
| 5,369,262 | 11/1994 | Dvorkis et al. ......................... 235/472 |

FOREIGN PATENT DOCUMENTS 0 573 018 A2  12/1993  European Pat. Off. .

*Primary Examiner*—Harold Pitts
*Attorney, Agent, or Firm*—Foley & Lardner

[57] ABSTRACT

A bar code scanning engine is disposed in a housing with a device that tracks the movement of the housing over a surface displaying symbols, such as bar codes, and provides an integrated bar code reading and locating assembly, commonly known as a mouse. When the mouse is in proximity to the bar code on the surface over which is tracks, switches on the mouse are actuated and circuitry in the mouse associated with the device and with the scanning engine initiates scanning, and provide outputs representing the location of the mouse on the surface and the bar code. The circuitry may be adapted to enable bar code scanning only when the mouse is located at selected positions on the surface where bar codes are expected to be found. The entire mouse assembly may be lifted from the surface and operated in a manner similar to a tethered hand-held bar code scanner using switches and scanner engine.

15 Claims, 1 Drawing Sheet

OPTICAL SCANNER ACTIVATED WITH POSITION LOCATOR

This is a continuation of application Ser. No. 08/522,054, filed Aug. 31, 1995, now abandoned, which is a continuation of application Ser. No. 07/975,760, filed Nov. 13, 1992, now U.S. Pat. No. 5,448,050.

DESCRIPTION

The present invention relates to symbol reading systems for reading symbols, such as bar codes on a surface, and particularly to a mouse trackable over the surface and providing outputs representing the position of the mouse on the surface and also the symbol.

The invention is especially suitable for use in reading bar codes on forms where one or more of bar codes are located and data is input via a keyboard and/or mouse into a computer system with software using the point and shoot capabilities customarily associated with a mouse. The form may also be placed on a pad and a mouse having an integrated bar code reader and location encoder is tracked over the surface. Outputs corresponding to the location of each of the bar codes and which represent the bar code at that location are then provided successively as the mouse is manipulated over the surface. These outputs classify the bar codes by location.

It has become common to place a plurality of bar codes on an item (e.g., the surface of the package containing the item) to identify the item in various ways, such as by stock number, inventory control number, manufacturing date, etc. Using a hand held bar code scanning reader, it is difficult to locate the scanning beam on particular ones of the bar codes on the surface to be scanned. Also the operator must keep track of the code is being scanned or additional information (bars) must be provided in order to identify the category of each of the codes. There may be insufficient space on the surface for the bar codes which have sufficient bars for the latter purpose. It is a feature of this invention to provide symbol (e.g., bar code) reading apparatus adapted for use with bar code scanners that deflect an optical beam across the codes), which automatically provides outputs representing the codes and outputs representing the locations of the codes being read/scanned, and particularly to an integrated device with which operating personnel are familiar or can easily be trained to use, namely a device similar to a computer mouse.

Briefly described, a mouse-like device in accordance with the invention is provided as an integrated optical symbol reading and location apparatus having a housing, which is movable over a surface on which the symbols may be presented for reading. The apparatus includes first means in the housing, which means is responsive to the location or movement of the housing on the surface for providing a first output representing the location. Second means for reading the symbols is responsive to light received from the symbols, as upon illumination by a scanning beam of a scan engine in the housing, which means is deflected out of a window in the housing toward the surface. Means are provided for enabling the first means (e.g., an encoder carried in the housing, which encoder tracks over the surface on which the bar codes are presented) and also the second means, when the housing is located in proximity to the symbols. The enabling means may include switches for circuitry in the housing to provide the location outputs and outputs representing the symbol being read. Also the entire assembly may be lifted from the surface and operated in the same manner as a hand held bar code scanner using the first means to enable reacting of the symbol.

BRIEF DESCRIPTION OF THE DRAWINGS

The foregoing and other features of the invention will become more apparent from a reading of the following description in connection with the accompanying drawings in which.

DETAILED DESCRIPTION

Figure 1:
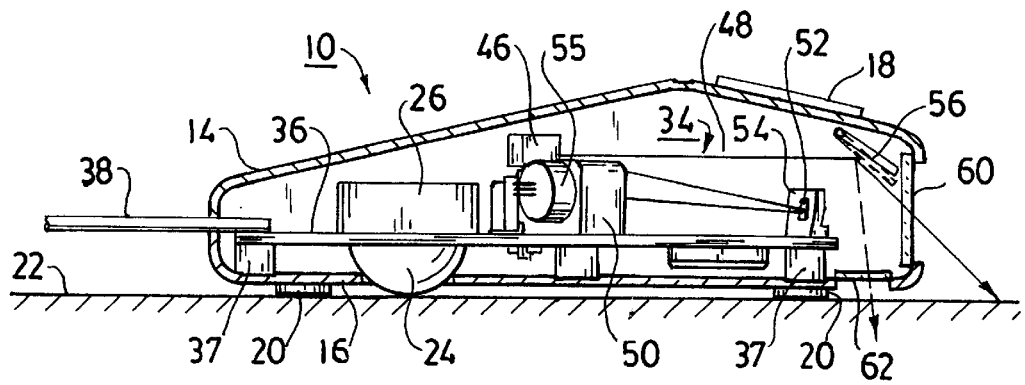
FIG. 1 is a sectional view, in elevation, of an integrated bar code reading and location mouse device, the section being taken along the line 1—1 FIG. 2.
Figure 2:
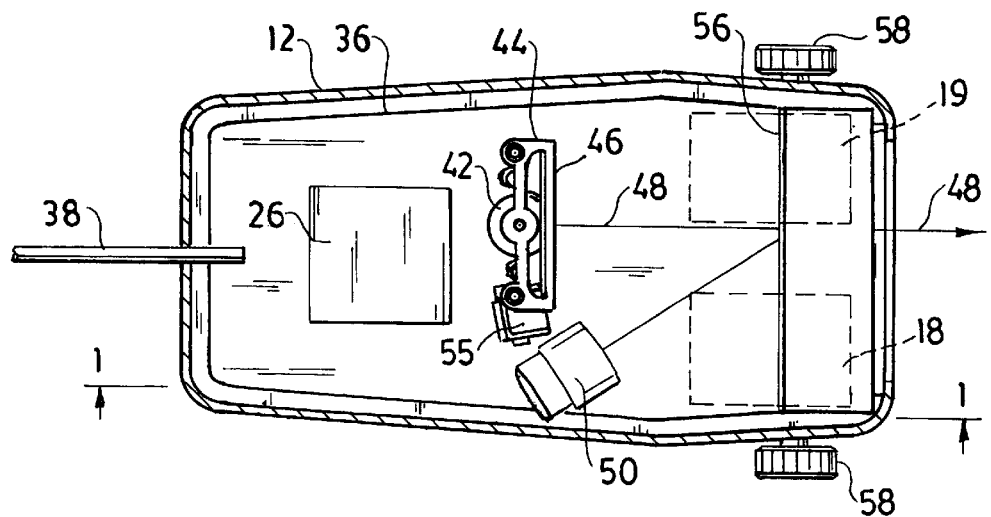
FIG. 2 is a plan view of the device shown in FIG. 1 with the top of the housing removed to illustrate the reading and location components therein.

Referring to FIGS. 1 and 2, there is shown an integrated bar code reader and location detection apparatus having a shape and size of, and operative in a manner similar to, a computer mouse. Accordingly, it is referred to as a bar code reading mouse 10. The mouse 10 has a housing 12 having top and bottom parts 14 and 16, which may snap together along a horizontal parting joint (not shown). The upper part of the housing 14 defines a top of the mouse 10 and the bottom part 16 defines the bottom of the mouse. The top has a pair of keys 18 and 19, the location of which is shown by the dash line boxes in FIG. 2. These keys operate electrical switches ($SW_1$ and $SW_2$) (see FIG. 3). The bottom of the housing 12 has pads 20 that space the housing from a surface 22 on which bar codes appear. The spacing is such that a ball 24 of an incremental encoder 26 contacts and engages the surface 22 and can roll universally as the mouse is moved in any direction along the surface 22.

Figure 3:
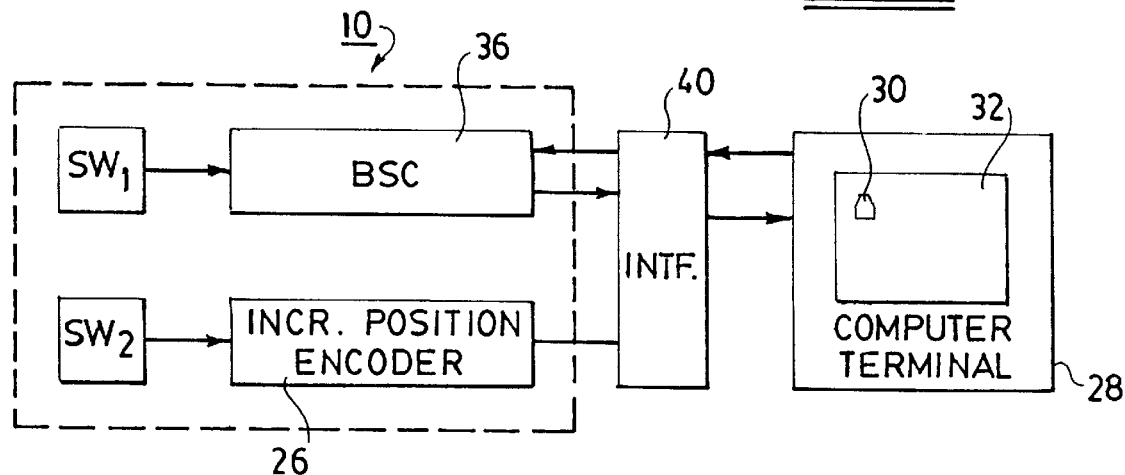
FIG. 3 is schematic, block diagram of a typical installation of the device shown in FIGS. 1 and 2.

The incremental encoder 26 may be of the type used in computer mouses. It provides an output indicating the relative displacement of the mouse along the surface 22. This displacement is converted by software in a computer terminal 28 (FIG. 3) so that the location of the mouse, indicated at 30 on the display screen 32 of the terminal 28 shown in FIG. 3 is indicated. Instead of a mechanical encoder type mouse location detection means, an optical encoder may be used. Then the surface 22 may be inscribed with orthogonal lines to which the optical encoder responds.

Reading of the bar codes is provided by a scan engine 34 having electrical and optical components mounted on a printed circuit board 36. This board 36 also mounts the encoder 26 and supports the ball 24. Electrical circuit paths or traces and terminals from the electrical components, which are connected to the traces on the board 36, are not shown to simplify the illustration. These circuits are connected to leads in a cable 38, which is a flexible cable extending from the mouse 10 to the computer terminal 28 (FIG. 3). The computer terminal or the board 36 may have components that provide an interface 40 that processes the output signals generated in the mouse 10 and may also provide input signals for controlling the operation of the mouse 10, as will be explained hereinafter. The interface may include signal conditioning means, decoders, and/or multiplexers of the type conventionally used to implement the interface functions.

The scan engine 34 is of a design similar to the design of the scan engine described in U.S. Pat. No. 5,200,597, issued Apr. 6, 1993, by Jay M. Eastman, et al. And assigned to the same assignee as the present Application. In the scan engine, a motor 42 pivots a mount 44 having a reflective surface 46, which projects a scanning beam 48. This beam is generated by a laser diode in a barrel or mount 50, which reflects from a facet 52 of a light collecting mirror 54. The collected light is reflected by the mirror 54 to a photo detector 53 and converted into analog bar code signals. These signals may be processed and decoded by circuits, including integrated circuit chips containing microprocessor devices and memory located on the board 36, but not show to simplify the illustration. The board is mounted by mounts 37 on the inside surface of the bottom of the housing 12. When portable operation is desired, batteries can be carried on board the mouse. Radio. Optical (e.g. infra-red) or accoustic links instead of wires may be used.

The scan beam 48 is incident on a mirror 56 of a mirror assembly, which includes knobs 58 extending from the sides of the housing 12. The mirror 56 folds the scan beam 48 so that it is deflected downwardly toward the surface 22 through either a window or port 60 in the front end of the housing or a window 62 in the bottom of the housing. These ports may be covered by transparent plates or may contain lenses for focusing the beam at the surface 22 or collimating the beam.

In a first mode of operation, the mouse is tracked along the surface 22 to the proximity of a bar code. Then $SW_2$ is actuated by operating the key 19 to provide an output through the interface to the terminal indicative of the location of the mouse in scanning position with respect to a selected code on the surface. Then $SW_1$ is actuated by the operating key 18 and the bar code scanner is enabled to provide a bar code signal output through the interface to the terminal, with processes an/or displays the output or a code corresponding thereto ro may store that code in a memory associated with the computer in the terminal.

In another mode of operation of the device, the computer is programmed (information being stored in its memory/database) as to the position of bar codes on the surface to be read. Then outputs are provided by the computer in response to location information from the encoder 26 relayed to the computer via the interface 40. The computer generates an output that, alternatively to $SW_1$, enables the bar code scanner 36 to scan the code. Then only selected codes on the surface will be scanned. Also the mouse may be lifted from the surface 22, pointed at a bar code (say on a package) and $SW_1$ operated to scan and read the bar code. Thus, the mouse is operative even when it is not placed on the surface 22 or another surface (e.g. the surface of the package).

From the foregoing description, it will be apparent that there has been provided improved symbol (bar code) reading apparatus that provides the facilities of a computer-type mouse for location and display of location and also a bar code reader to be used in conjunction with computer systems and software suing input data from a mouse, a bar code scanner, a keyboard or the like. Variations and modifications in the herein illustrated integrated symbol reading and location apparatus, within the scope of the invention, will undoubtedly suggest themselves to those skilled in the art. Accordingly the foregoing description should be taken as illustrative and not in a limiting sense.

I claim:

1. An optical scanner comprising:
 a universally movable body;
 an optical scanning engine mounted on the movable body, the optical scanning engine being adapted to direct scanning light toward a surface, receive the scanning light reflected off the surface, and output a first signal representative of a scanned data from the surface;
 a position sensor mounted on the movable body, the position sensor being adapted to output a second signal indicative of movement of the movable body; and
 means for automatically activating the scanning engine upon the second signal indicating that the movable member is positioned in an area where a symbol to be scanned is located.

2. An optical scanner according to claim 1, further including a switch for manually activating the position sensor.

3. An optical scanner according to claim 2, further including a switch for manually activating the optical scanning engine independently of the activating means so that the scanner engine can be manually activated at anytime regardless of where the movable body is positioned or located.

4. An optical scanner according to claim 2, wherein the position sensor is an incremental encoder for identifying an X-Y coordinate of the surface.

5. An optical scanner according to claim 4, wherein the incremental encoder comprises a track ball universally rotatably mounted relative to the movable member and adapted to rotate when the movable member is moved while the track ball is engaged with the surface, the movable member position being determined based on amount and direction of the track ball rotation.

6. An optical scanner according to claim 5, further comprising a circuit board mounted to the movable member, wherein the incremental encoder, including the track ball, and the scanning engine are mounted to the circuit board.

7. An optical scanner according to claim 6, further comprising a reflector mounted to the movable body, which reflector is movable between a first position to direct the scanning light at a first general direction and a second position to direct the scanning light at a second general direction.

8. An optical scanner according to claim 7, further including at least one knob for manually moving the reflector between the first and second positions.

9. An optical scanner according to claim 8, wherein the movable body comprises a housing that contains the circuit board with the scanning engine and the incremental encoder, and the reflector.

10. An optical scanner according to claim 9, wherein the housing includes a first light-transmissive window and a second light-transmissive window, which is substantially perpendicular to the first light transmissive window, wherein the reflector is adapted to direct the scan light through the first light-transmissive window when the reflector is at the first position and through the second light-transmissive window when the reflector is at the second position.

11. An optical scanner according to claim 1, wherein the activating means includes a microprocessor and a memory for storing a predetermined location of a symbol to be scanned, the microprocessor adapted to receive the second signal indicative of the position of the moving body from the position locator and activate the scanning engine upon the moving body being positioned in the predetermined location.

12. An optical scanner according to claim 11, wherein the predetermined location is an area proximate the location of the symbol to be scanned.

13. An optical scanning system comprising:
 a universally movable body;
 an optical scanning engine mounted on the movable body, the optical scanning engine adapted to direct scanning light toward a surface to be scanned, receive the scanning light reflected off the surface, and output a first signal representative of a scanned data from the surface;
 a position sensor mounted on the movable body, the position sensor being adapted to output a second signal indicative of movement of the movable body; and a computer for receiving the first and second signals and for activating the scanning engine upon the second signal indicating that the moving body is positioned in an area where a symbol to be scanned is located.

14. An optical scanning system according to claim 13, wherein the computer includes a microprocessor and a memory for storing a predetermined location of the symbol to be scanned, the microprocessor being adapted to receive the second signal indicative of the position of the moving body from the position sensor and activate the scanning engine upon the moving body being positioned in the predetermined location.

15. An optical scanning system according to claim 14, wherein the predetermined location is an area proximate the location of the symbol to be scanned.

* * * * *